United States Patent [19]

Kitamura et al.

[11] Patent Number: 5,053,661

[45] Date of Patent: Oct. 1, 1991

[54] GEARED MOTOR WITH AN IMPROVED LUBRICATING SEAL

[75] Inventors: Hiroshi Kitamura, Kadoma; Mizuo Komine, Ikoma, both of Japan

[73] Assignee: Matsushita Electric Industrial Co., Ltd., Kodama, Japan

[21] Appl. No.: 588,617

[22] Filed: Sep. 26, 1990

[30] Foreign Application Priority Data

Sep. 27, 1989 [JP] Japan .................................. 1-113723

[51] Int. Cl.$^5$ ............................................. H02K 7/108
[52] U.S. Cl. ..................................... 310/83; 310/90; 310/99; 277/152; 74/467
[58] Field of Search .................... 310/83, 344, 99, 254, 310/261, 90, 89; 74/467, 7 E, 640; 277/152, 58, 153

[56] References Cited

U.S. PATENT DOCUMENTS 4,792,243  12/1988  Takeuchi et al. .................... 277/152

*Primary Examiner*—Steven L. Stephan
*Assistant Examiner*—Edward H. To
*Attorney, Agent, or Firm*—Cushman, Darby & Cushman

[57] ABSTRACT

A geared motor having a gear case and a motor housing. The gear case contains reduction gears and a viscous grease which lubricates the reduction gears and fills the a gear case. An integrally formed main oil seal having a main lip and a dust lip and a sub oil seal having a sub lip are disposed between a rotor shaft of the motor and the motor housing. The sub oil seal is disposed between the gear case and the main seal to prevent the viscous grease and metal powder in the viscous grease resulting from wear of the gear (101) from jeopardizing the main seal. In some embodiments, a second grease is retained in a space formed between the sub lip and the main lip. An outer wheel of a ball bearing supports the rotor shaft and is fixed to the bottom of the motor housing so that the rotor shaft cannot move in its axial direction and so that the rotor shaft will be firmly sealed by the main oil seal and the sub oil seal.

5 Claims, 5 Drawing Sheets

GEARED MOTOR WITH AN IMPROVED LUBRICATING SEAL

BACKGROUND OF THE INVENTION

1. Field of the Invention

The present invention relates to a motor with reduction gears to be used as a power source of a general industrial machine such as a conveying machine or a manufacturing machine. The present invention especially relates to an improvement in the sealing of the grease which lubricates the gears.

2. Description of the Related Art

In a geared motor, helical gears are effective for noise reduction and are used as initial high speed reduction gears greasebath type lubrication is widely adopted to lubricate the reduction gears, to reduce noise, and to extend the life of the gears, because it can be located free from the direction of the gears and because it can be easily maintained.

Figure 7:
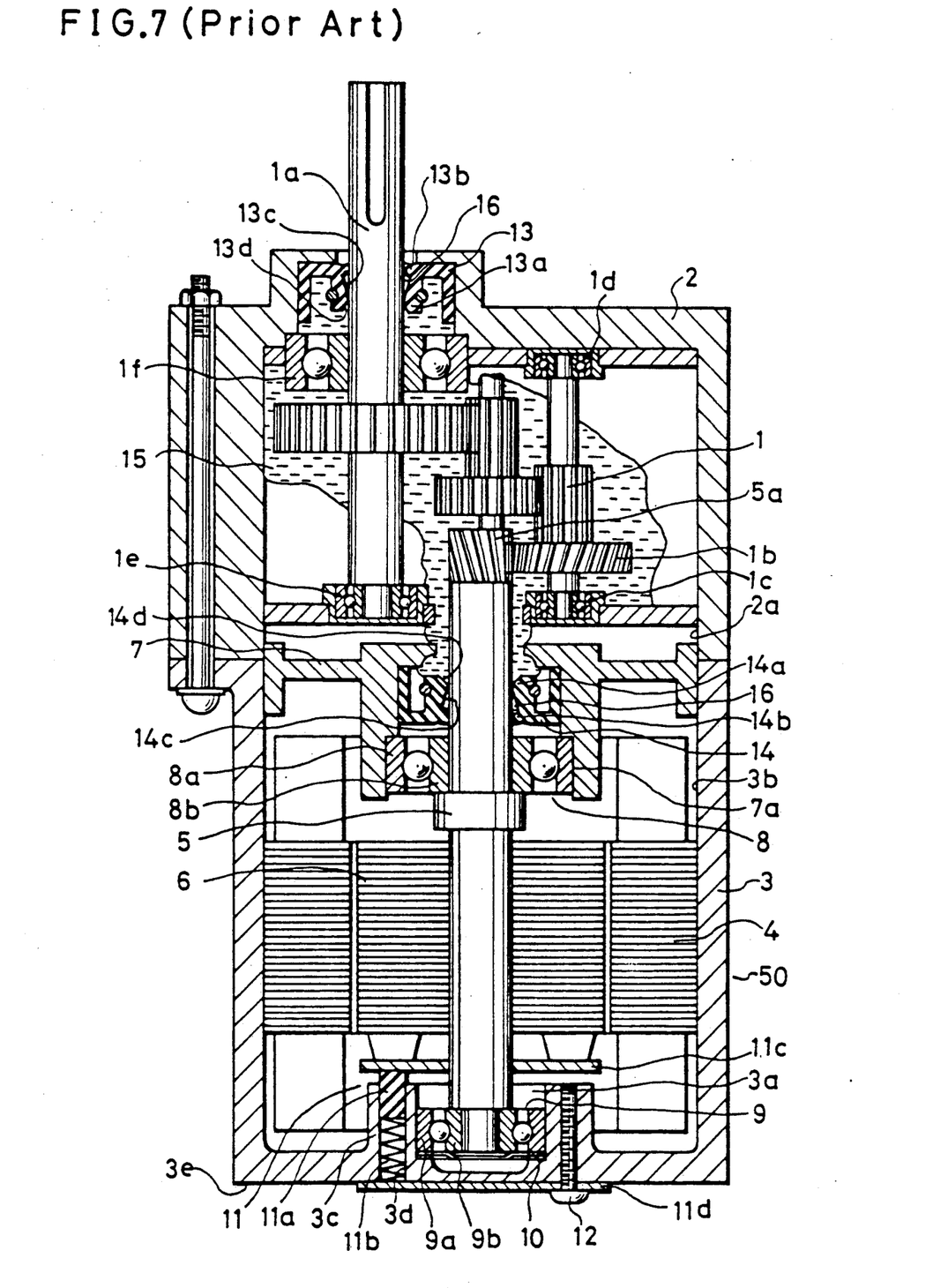
FIG. 7 is the cross-sectional side view showing the the conventional geared motor, wherein the section plane is vent against the axis of the motor.

A conventional geared motor having greasebath type lubrication is described referring to FIG. 7. FIG. 7 is a cross-sectional view of the conventional geared motor.

In FIG. 7, reduction gears 1 having an output shaft 1a are contained in a gear case 2. A frame 3 of the motor 50 has a hole 3a, to which a ball bearing 9 is fit, on the bottom thereof. A stator core 4 is fit to an inner face 3b of the frame 3 and fixed thereon. A helical gear 5a is formed on an end of a rotor shaft 5 and is gear-coupled with another helical gear 1b of the initial gear of the reduction gears 1. A rotor 6 of the motor 50 is fixed on the rotor shaft 5. A bracket 7 of the motor 50 is fit to the inner surfaces 2a of the gear case 2 and 3b of the frame 3. An outer wheel 8a of a ball bearing 8 is fit in a hole 7a of the bracket 7 and an inner wheel 8b of the ball bearing 8 is press-fit to the rotor shaft 5. An outer wheel 9a of another ball bearing 9 is fit in the hole 3a of the frame 3 and an inner wheel 9b of the ball bearing 9 is press-fit on the rotor shaft 5.

A spring washer 10 is provided between the ball bearing 9 and the bottom face of the hole 3a of the frame 3 for supplying a thrust pre-load to the ball bearing 9. A simplified brake mechanism 11 is provided in a side wall 3c of the hole 3a of the frame 3. The simplified brake mechanism 11 comprises: a brake shoe 11a and a spring 11b for supplying pressure to the brake shoe 11a which are provided in a hole 3d the side wall 3c; a brake disc 11c fixed on the rotor shaft 5; and a spring cap 11d. Braking force which is to be supplied to the motor 50 is made by friction between the brake disc 11c and the brake shoe 11a. The spring cap 11d is fixed on an outer face 3e of the frame 3 by a screw 12.

In such a conventional geared motor, the ball bearing 9 which is apart from the reduction gears 1 is generally smaller than the ball bearing 8 which is adjacent to the reduction gears 1, because the simplified brake mechanism 11 is provided in the side wall 3c of the hole 3a of the frame 3 to which the ball bearing 9 is to be fit.

An oil seal 13 is provided between the output shaft 1a of the reduction gears 1 and the gear case 2 for preventing the leakage of the grease 15 (which fills the gear case 2 to the outside of the gear case 2). Another oil seal 14 is also provided between the rotor shaft 5 and the bracket 7 for preventing leakage of the grease 15 to the inside of the motor 50 (or the inside of the frame 3). The oil seals 13 and 14 are made of rubber and each has a main lip 13a or 14a and a dust lip 13b or 14b. Generally, the dust lips 13b and 14b are positioned behind the main lips 13a and 14a against the material, here grease 15 being sealed. In the surroundings of the reduction gears 1, a large amount of the grease 15 is required to lubricate the gears.

The driving force of the motor 50 is transmitted to the reduction gears 1 via the rotation of the rotor shaft 5. The rotor shaft 5 is born by the two bearings 8 and 9 since the inner wheels 8b and 9b are press-fit to and fixed on the rotor shaft 5. The outer wheels 8a and 9a are respectively fit in the holes 7a of the bracket 7 and 3a of the frame 3 with gaps of 10 to 20 μm separating the inner wheels and outer wheels.

The reduction gears 1 are generally made of steel because of steel's strength. The steel gears, however, are easily worn and make excessive noise when they are geared each other without oil. Accordingly steel reduction gears must be lubricated. In order to assure long life of the gears and in order to reduce noise, the above-mentioned grease-bath type lubrication is widely adopted in the conventional geared motor.

In the above-mentioned grease-bath type lubrication, a large amount of the grease 15 with a high viscosity and a inertia is used to lubricate the steel gears. The grease 15 always flows during the rotation of the gears, so that plenty of grease 15 is supplied to the output shaft 1a which rotates to transmit the driving force of the motor 50 to the outside, and so that grease 15 surges along the rotor shaft 5 which rotates to transmit the driving force to the reduction gears 1. Accordingly, the oil seals 13 and 14 are necessary to seal the gaps around the shafts 1a and 5.

In the above-mentioned conventional geared motor, the oil seals 13 and 14 are made of rubber. Accordingly there is a problem of short life of the seals 13 and 14 due to cracking of the seals, wear of the lips of the seals, or hardening of the lips caused by friction heating.

Some mechanisms which operate to shorten-life of the conventional seals 13 and 14 are.

(1) The magnitude of the flow of the grease 15 depends upon the rotation speed and/or rotation direction of the shafts 1a and 5. When rotor shaft 5 rotates at high speed, thrust is generated by the helical gears 5a and 1b, so that the flow of the grease 15 impinges the lips 14a and 14b of the oil seal 14. When the rotation direction of the rotor shaft 5 alternately changes, the direction of the flow of the grease 15 also alternately changes. Thereby, a dynamic pressure due to the flow of the grease 15 is intermittently applied to the oil seal 14. The lips 14a and 14b of the oil seal 14 is, on one hand, strongly pressed on the rotor shaft 5 by such a dynamic pressure of the flow of the grease 15 and immoderate friction force is generated between the lips 14a and 14b and the rotor shaft 5. On the other hand, the lips 14a and 14b are moved in reciprocation in the axial direction by a pressure inversion due to the flow of the grease 15.

Furthermore, when a thrust load due to the gearcoupling of the helical gears 5a and 1b is applied to the rotor shaft 5 in axial direction thereof, the rotor shaft 5 moves in the axial direction by the alternate inversion of the rotation direction. This movement is possible because there is a gap between the ball bearing 9 and the bottom of the hole 3a of the frame 3 and because the spring washer 10 is provided in the gap for supplying the pre-load to the bearing 9. When the rotor shaft 5 moves in reciprocation in the axial direction, the sealing between the rotor shaft 5 and the oil seal 14 is easily broken, since the sealing face of the oil seal 14 is designed short against the axial motion of the rotor shaft 5.

Moreover, when the rotor shaft 5 moves in reciprocation in the axial direction, the outer wheel 9a of the ball bearing 9 slides on the spring washer 10 due to the creep of the outer wheel 9a. As a result the spring washer 10 is often broken.

(2) Furthermore, metal powder generated by the wear of the gears or bearings 1c, 1d, 1e and 1f of the reduction gears 1 is mixed in the grease 15. When the metal powder reaches to the lips 13a, 13b, 14a and 14b of the oil seals 13 and 14 via the flow of the grease 15, the lips 13a, 13b, 14a and 14b are damaged and thereby causing grease 15 to leak.

(3) In order for the oil seals 13 and 14, it oil films must form on the slipping part between the shafts 1a and 5 and the oil seals 13 and 14. For this purpose, another kind of grease 16 is provided to lubricate the lips 13a, 13b, 14a and 14b of the oil seals 13 and 14. This other kind of grease 16 is different from the grease 15 fills cavities 13c, 13d, 14c and 14d in the vicinity of the main lips 13a and 14a and the dust lips 13b and 14b. It, however, is impossible in the conventional geared motor, to hold the lip-lubricating grease 16 inside cavities 13d and 14d facing to the reduction gears 1 the gear-lubricating grease 15 containing the metal powder mixes readily which the lip-lubricating grease 16.

Furthermore, the gear-lubricating grease 15 is viscous for heavy loading of the gear-coupling. It is not suitable for lubricating the minute gaps between the oil seals 13 and 14 and the shafts 1a and 5, because the necessary thin oil films are not formed by such viscous grease. Because the necessary oil films are is not formed between the oil seal 13 or 14 and the shaft 1a or 5, the oil seal 13 or 14 made of rubber slide directly on the shaft 1a or 5 made of metal. Therefore, the rubber becomes hard due to friction heat and long time friction. As a result, the gear-lubricating grease 15 leaks out.

Due to the above-mentioned reasons, oil seals 13 and 14 in the conventional geared motor grease-bath type lubrication require frequent service. Namely, those conventional geared motor, which use oil seals with only main lips 13a and 14a suffer early raise the leakage of the grease 15 in relatively early. The grease 15, which is for lubricating the reduction gears 1 flowing in the interior of the motor, flows further to the inside of the ball bearings 8 and 9 and air gaps between the rotor 6 and the stator 4. The adhesion of the viscous grease 15 on the ball bearings 8 and 9 and so on raises loss of the output power of the motor 50 and also raises the failure in start or burning of the motor 50.

For solving the above-mentioned problems, methods for increasing the interference of the main lips 13a and 14a of the oil seals 13 and 14 against the shafts 1a and 5 and for using two oil seals in series besides the above-mentioned type oil seal 13 or 14 have been proposed. Both methods, however, increase of the mechanical loss due to the friction of the oil seals and increase the volume which is necessary for the provision of the sealing members. Therefore, proposed methods cannot be adopted in small geared motors, e.g. geared motors which output several watt to several tens watts.

Generally, the frame 3 which has the hole 3a for accommodating the outer wheel 9a of the ball bearing 9, is made by aluminum because aluminum has splendid workability. However, in case that a load which is to be driven by the geared motor is largely rippled, or in case that the load is intermittently and/or frequently driven, creeps in radial direction or in the axial direction are generated on the surface of the outer wheel 9a due to the vibrations of the machine and/or the motor itself. This is because the coefficient of the thermal expansion of aluminum is larger than that of steel from which the outer wheel 8a or 9a of the ball bearing 8 or 9 is mode. Accordingly a gap is made between the outer wheel 8a or 9a of the ball bearing 8 or 9 and the inner face of the hole 7a of the bracket 7 or 3a of the frame 3, which were closely fit to each other at the beginning of the driving, under conditions of high temperature due to the driving of the motor.

Especially, the ball bearing 9 which does not receive the load directly easily creeps because the load applied to the output shaft 1a of the reduction gears 1 is magnified by the principle of a lever wherein. The ball bearing 8 serves as a fulcrum, and a force of magnified load is applied to the ball bearing 9. Furthermore, the ball bearing 9 is smaller than the ball bearing 8, and hence the ball bearing 9 is easily influenced by the creep.

When the outer wheel 9a of the ball bearing 9 slips on the inside face of the hole 3a of the frame 3, abnormal noise may occur. Or, holding of the rotor shaft 5 by the ball bearing 9 may become unstable by abnormal friction between the outer wheel 9a of the ball bearing 9 and the inside face of the hole 3a. Furthermore, the life of the ball bearing 9 is shortened by abnormal heating thereof due to the abnormal friction heat or by the mixing of the metal powder in the the grease 15. As a result, the torque of the motor 50 is reduced or the motor 50 seizes and finally burning occurs in the motor 50.

The afore-mentioned two problems, the leakage of the grease 15 and the creep of the ball bearing 9, are the weakest point of a motor 50 with reduction gears 1. The life of such an electric motor 50 is determined inconsistent with the merit of the grease-bath type lubrication directed for elongating the life of the gears.

As an example, in a small typical geared motor which outputs several watts to several tens of watts and has a square section of 60 mm to 90 mm of a side of the case of the reduction gears, this typical life time of conventionally lubricated spur gears on which grease is spread is about 5,000 hours. On the other hand, according to theoretical view point, the life of the geared motor adopting the grease-bath type lubrication and the helical gears can be elongated two times as long as that of the above-mentioned conventional. The life time, however, is actually limited to of 3,000 to 5,000 hours due to the above-mentioned problems of the leakage of the grease and the creep of the bearing.

SUMMARY OF THE INVENTION

One purpose of the present invention is to solve the above-mentioned problems to provide an improved geared motor with grease-bath type lubrication and helical gears, which has a long life service.

A geared motor in accordance with the present invention comprises:
 a housing;
 a motor having a stator fixed to inside face of the housing and a rotor which is held rotatable with respect to the stator;
 plurality of reduction gears which is provided in a case which is fixed to the housing of the motor and is for reducing rotation speed of the motor and lubricated by a grease;

sealing means which is provided between a rotor shaft and the housing, is positioned adjacent to the reduction gears, and integrally has a main oil seal member with main lip and a sub oil seal member with sub lip, the sub lip being positioned nearer to the grease to be sealed than the main lip;

at least two ball bearings for rotatably supporting the rotor shaft;

a cup-shaped part formed on a bottom of the housing to which one of the ball bearing is fit; and bearing fixing means fixed on a side wall of the cup-shaped part of the housing by screws from outside of the housing, thereby fixing an outer wheel of the one of ball bearing in the cup-shaped part of the housing.

In the above-mentioned geared motor the sub lip is positioned nearer to the grease for lubricating the reduction gears than is the main lip. Therefore, the arrival at the main lip of grease contaminated by mixing of worn metal powder of the gears can be prevented by the sub lip. And further, the sub lip absorbs fluctuations in pressure due to the flow of the grease, thereby reducing the effect of the pressure change of the grease an the main lip.

Furthermore, the main oil seal and the sub oil seal are integrally configurated into one body, so that a sufficient amount of lip-lubricating grease, which hitherto cannot be filled, can be sealed in a space formed between the main oil seal and the sub oil seal. As a result, the main lip can be maintained in a good lubrication state by the clean lip-lubricating grease substantially permanently.

Moreover the outer wheel of the ball bearing which is apart from the reduction gears is fixed on the frame by the bearing fixing means, and the inner wheel of the bearing is press fit to the rotor shaft of the motor. Therefore, the rotor shaft does not move in reciprocation in the axial direction, and thereby the sealing of the oil seals are not broken.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF THE PREFERRED EMBODIMENTS

A preferred embodiment of a geared motor in accordance with the present invention is described referring to FIGS. 1, 2, 3, 4, 5 and 6.

Figure 1:
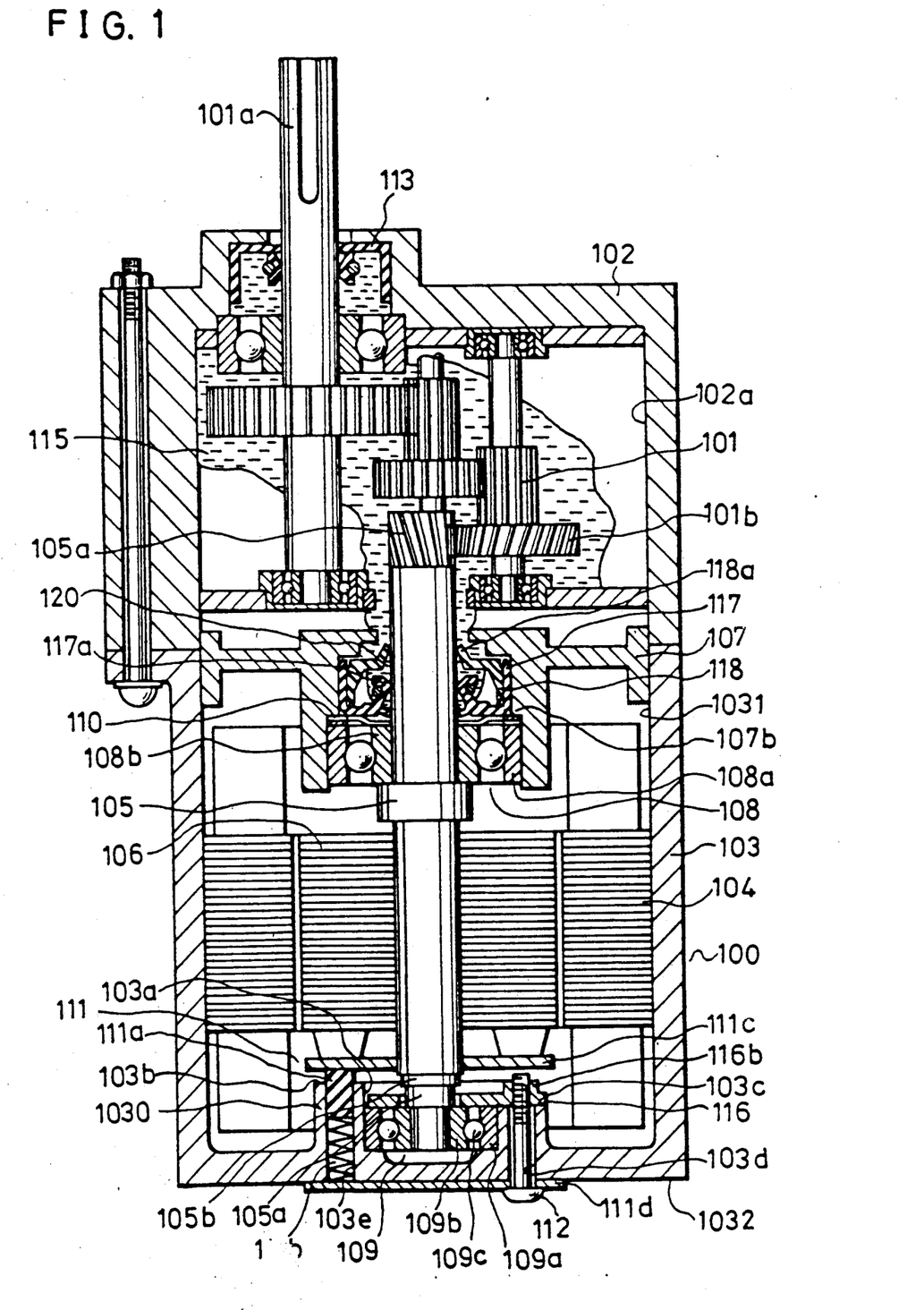
FIG. 1 is a cross-sectional side view showing of a preferred embodiment of a geared motor in accordance with the present invention, wherein the section plane is vent against an axis of the motor.

FIG. 1 is a cross-sectional side view of an embodiment of the geared motor in accordance with the present invention. In FIG. 1, reduction gears 101 having an output shaft 101a are contained in a gear case 102. A frame 103 of the motor 100 has a cup-shaped part 1030 on a bottom of the frame 103. A ball bearing 109 is fit in a center hole 103a of the cup-shaped part 1030. A stator core 104 of the motor 100 is fit to an inner face 1031 of the frame 103 and fixed thereon. A helical gear 105a is formed on an end of a rotor shaft 105 of the motor 100 and the helical gear 105a is gear-coupled with another helical gear 101b of the initial gear of the reduction gears 101. A rotor 106 of the motor 100 is fixed on the rotor shaft 105. A bracket 107 of the motor 100 is fit to the inner surfaces 102a of the gear case 102 and 1031 of the frame 103. An outer wheel 108a of a ball bearing 108 is fit in a hole 107a of the bracket 107 shown in FIG. 6, and an inner wheel 108b of the ball bearing 108 is press-fit to the rotor shaft 105. An outer wheel 109a of the ball bearing 109 is fit in the center hole 103a of the cup-shaped part 1030 of the frame 103, and an inner wheel 109b of the ball bearing 109 is press-fit to the rotor shaft 105. A spring washer 110 is provided between the ball bearing 108 which is positioned adjacent to the reduction gears 101 and an offset part 107b of the bracket 107. A brake assembly 111 is provided in a side wall 103b of the cup-shaped part 1030 of the frame 103. The brake assembly 111 comprises: a brake disc 111c fixed on the rotor shaft 105; plurality of brake shoes 111a (for simplification of illustration, only one of plural brake shoes is shown in FIG. 1) which are put in holes 103e (shown in FIG. 2) and contact the brake disc 111c; the same number of springs 111b for supplying pressure to respective brake shoes 111a provided in the holes 103e; and a spring cap 111d. Braking force which is to be supplied to the motor 100 is generated by friction between the brake disc 111c and the brake shoes 111a.

Figure 2:
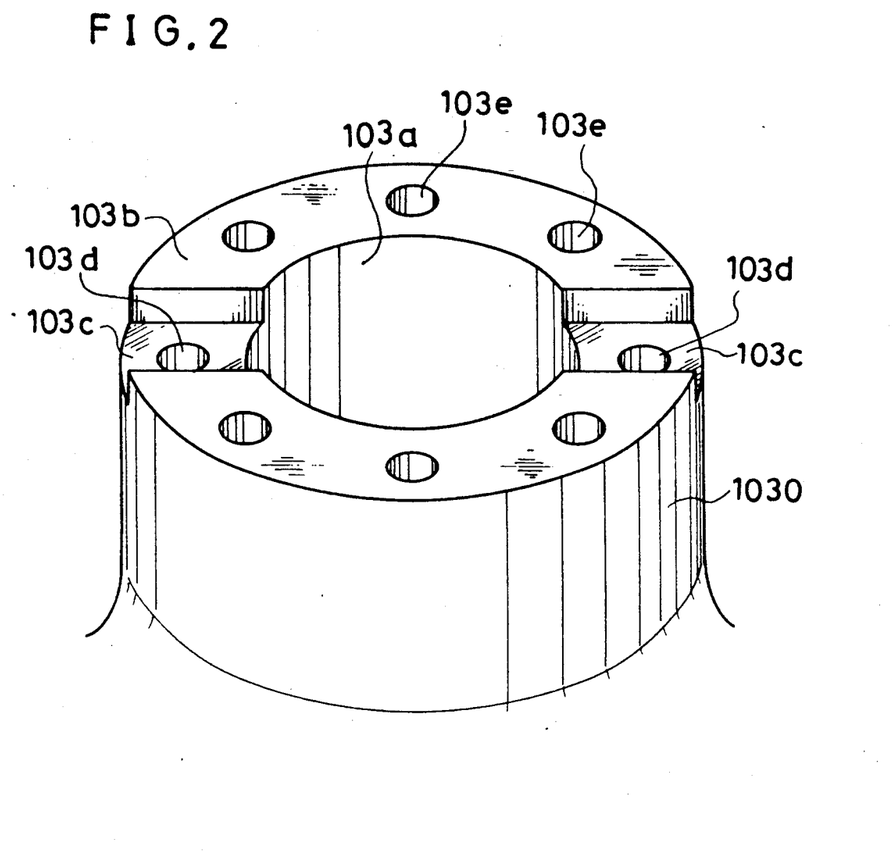
FIG. 2 is a perspective view showing the details of a cup-shaped part 1030 of a frame 103 of the motor 100 shown in FIG. 1 formed on a bottom of the frame 103.
Figure 3:
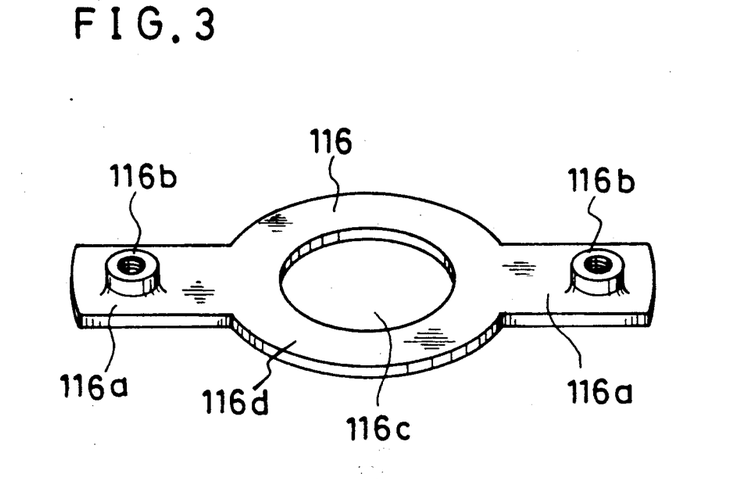
FIG. 3 is a perspective view showing the details of a bearing fixing plate 116.

FIG. 2 is a perspective view showing the details of the cup-shaped part 1030 of the frame 103 of the motor 100 and FIG. 3 is a perspective view showing the details of the bearing fixing plate 116.

In FIG. 2, the cup-shaped part 1030 of the frame 103 has plurality of the holes 103e in its side wall 103b to which the brake shoes 111a are put and a pair of guide grooves 103c and 103c which are symmetrically positioned with respect to the axis of the center hole 103a. On respective guide grooves 103c and 103c, screw holes 103d and 103d are provided.

In FIG. 3, the bearing fixing plate 116 comprises a ring part 116d and protruded parts 116a and 116a provided symmetrically with respect to the center of a center hole 116c of the ring part 116d. On respective protruded parts 116a and 116a, female screw parts 116b and 116b, to which male screws 112 are screw-coupled from outside of the frame 103 as shown in FIG. 1, are formed. Outer periphery of the ring part 116d is to be fit in the center hole 103a of the cup-shaped part 1030 with a predetermined gap therebetween, and also the protruded parts 116a and 116a are to be fit in the guide grooves 103c and 103c of the cup-shaped part 1030 with predetermined gaps therebetween. The center hole 116c of the ring part 116d is to be press-fit lightly to the offset part 105b of the rotor shaft 105 as shown in FIG. 4.

Figure 6:
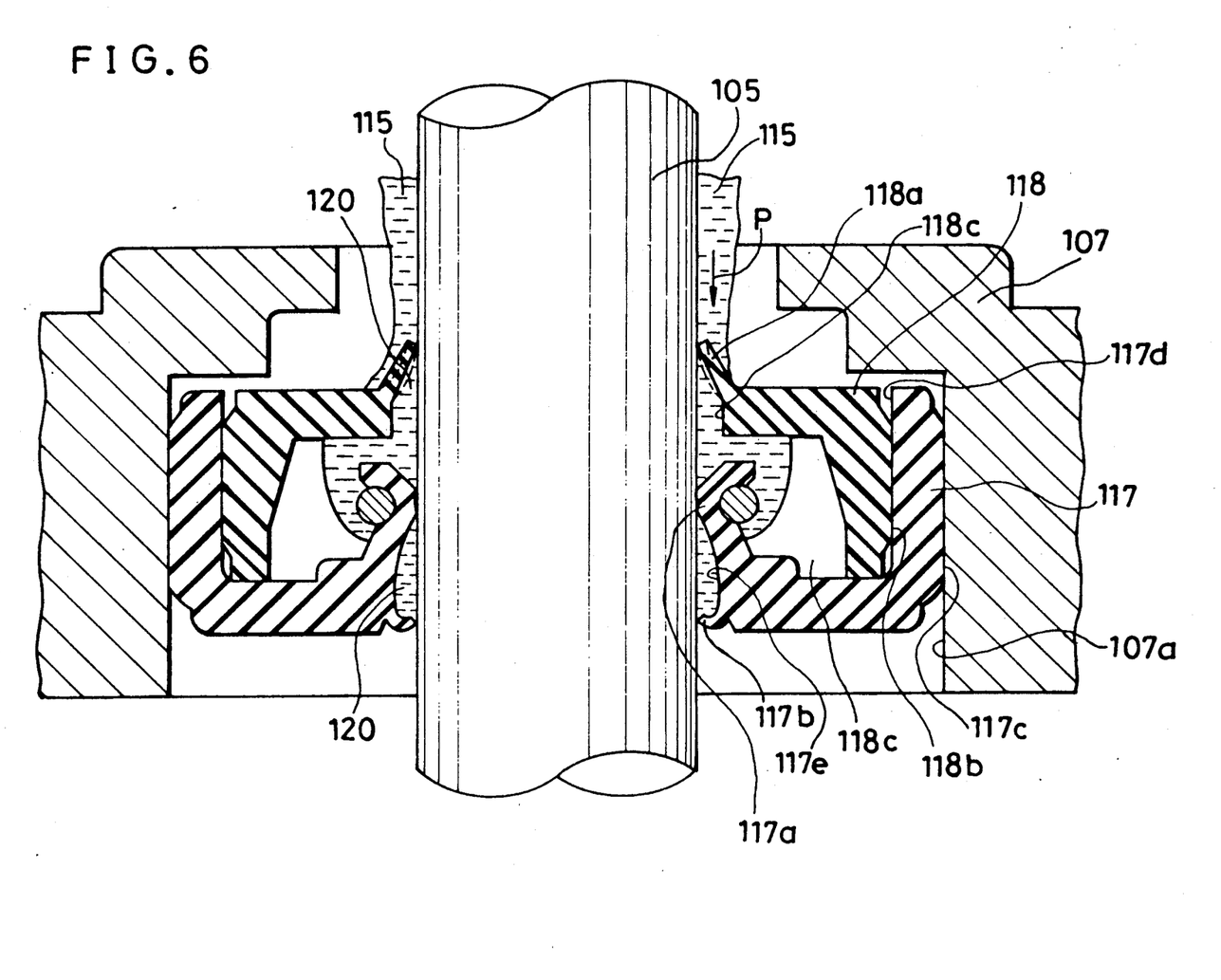
FIG. 6 is a cross-sectional side view showing the details of oil seals 117, 118 used on the rotor shaft 105 of the motor.

FIG. 6 is an enlarged cross-sectional side view showing the details of the oil seals 117 and 118.

In FIG. 6, the main oil seal 117 has a main lips 117a and a dust lip 117b and the sub oil seal 118 has a sub lip 118a. The main oil seal 117 and the sub oil seal 118 are coupled integrally into one body and positioned in a manner such that: an outer periphery 117c of the main oil seal 117 is fit to an inner surface of the hole 107a of the bracket 107; an outer periphery 118b of the sub oil seal 118 is fit to an inner periphery 117d of the main oil seal 117; the sub lip 118a of the sub oil seal 118 faces to the reduction gears 101 as shown in FIG. 1; the dust lip 117b of the main oil seal 117 faces to the ball bearing 108 as shown in FIG. 1; and the main lip 117a is positioned between the sub lip 118a and the dust lip 117b. Lip-lubricating grease 120 for lubricating the lips 117a, 117b and 118a is filled in a space 117e formed between the main lip 117a and the dust lip 117b and in a space 118c formed between the main lip 117a and the sub lip 118a.

Figure 4:
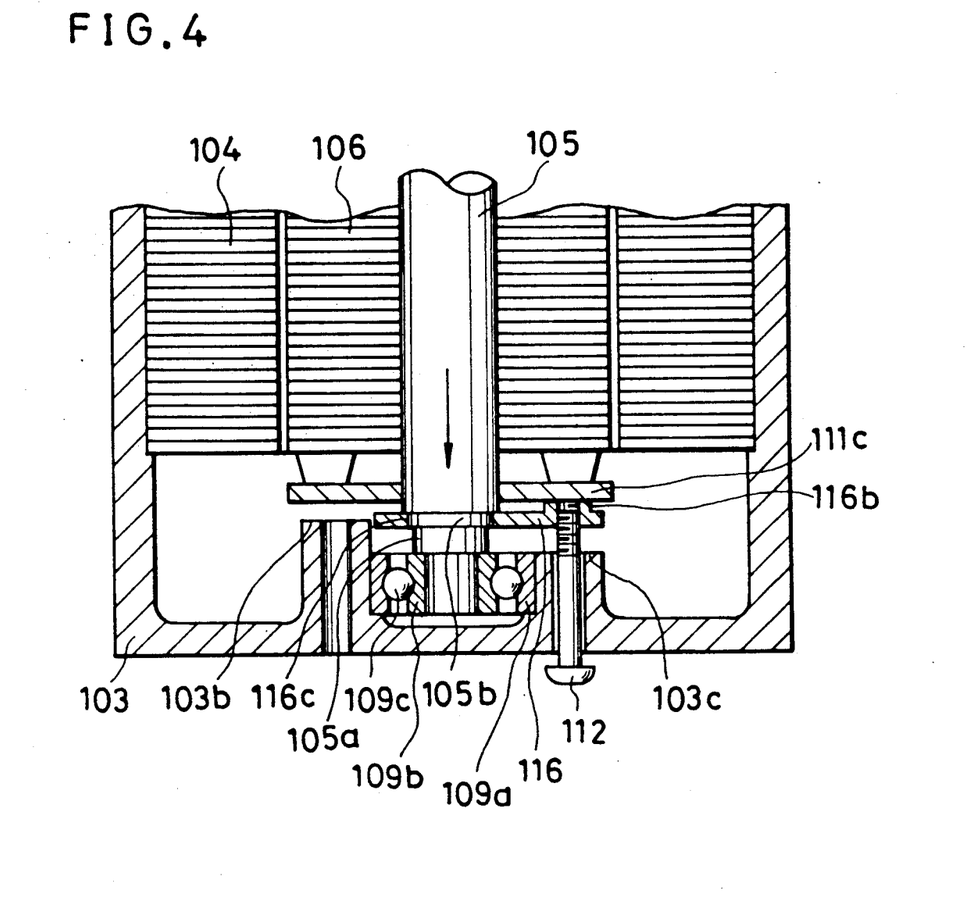
FIG. 4 is a cross-sectional side view showing a manufacturing process of the geared motor in accordance with the present invention.
Figure 5:
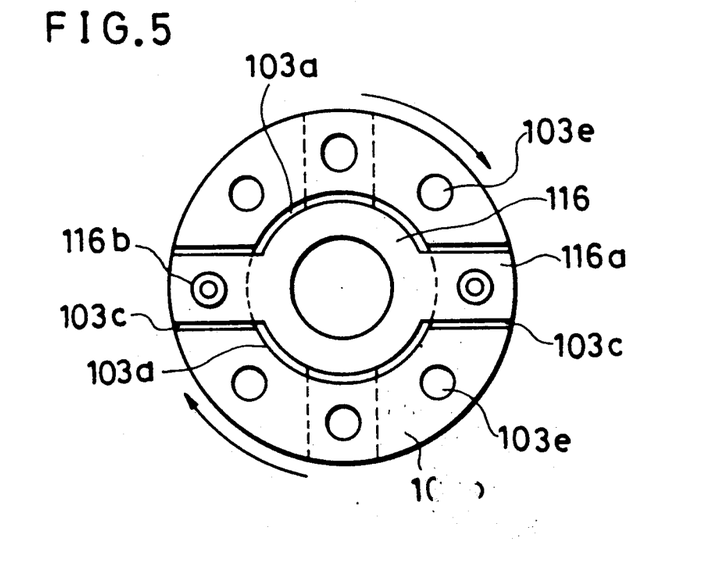
FIG. 5 is a plan view showing the fitting of the bearing fitting plate 116 in a groove of the cup shaped part 103.

Assembling of the ball bearing 109 which is apart from the reduction gears 101 is described referring to FIGS. 4 and 5.

At first, the center hole 116c of the bearing fixing plate 116 is lightly press-fit to the offset part 105b of the rotor shaft 105. And the inner wheel 109b of the assembled ball bearing 109 is press-fit on the rotor shaft 105. After that, the ball bearing 109 is put in the center hole 103a of the cup-shaped part 1030 of the frame 103. The protruded parts 116a and 116a are put on the upper face of the side wall 103b of the cup-shaped part 1030, for example, shown by broken lines in FIG. 5.

And then, when the rotor shaft 105 is rotated in a clockwise direction shown by the arrow in FIG. 5, the bearing fixing plate 116 which is lightly press-fit to the offset part 105b of the rotor shaft 105 also rotates at the same time. The rotation of the rotor shaft 105 is stopped to make the protruded parts 116a and 116a face to the guide grooves 103c and 103c as shown by solid lines in FIG. 5. At this time, plurality of the holes 103e are not closed by the bearing fixing plate 116, so that the brake shoes 111a and the springs 111b can be put in the holes 103e.

As mentioned above, the female screw parts 116b and 116b are exactly positioned for facing to the screw holes 103d and 103d (in FIG. 2) on the guide grooves 103c and 103c of the cup-shaped part 1030. And the male screws 112 are screwed in the screw holes 103d and 103d from outside of the frame 103 and screw-coupled with the female screw parts 116b and 116b as shown in FIG. 4. By turning the male screw 112, the bearing fixing plate 116 is pulled to the ball bearing 109. Thereby, the bearing fixing plate 116, which was at first fit to the rotor shaft 105, is disconnected from the offset part 105b of the rotor shaft 105. And finally the bearing fixing plate 116 is fixed to contact an end of the outer wheel 109a of the ball bearing 109 on the cup-shaped part 1030 of the frame 103. Namely, the outer wheel 109a of the ball bearing 109 is firmly fixed on the center hole 103a of the cup-shaped part 1030 of the frame 103.

In this state, the center hole 116c of the bearing fixing plate 116 is positioned on the same plane of another offset part 105a of the rotor shaft 105 which has a smaller diameter than that of the offset part 105b as shown in FIGS. 1 and 4. Therefore, the rotor shaft 105 can be rotated without touching the bearing fixing plate 116.

By turning of the male screws 112, the spring cap 111d is fixed on an outer face 1032 of the frame 103, and thereby the assembly of the brake assembly 111 is completed.

Operation of the above-mentioned geared motor in accordance with the present invention is described.

When the motor 100 is driven, rotation force is transmitted to the reduction gears 101 via the rotation of the rotor shaft 105. The grease 115, which lubricates the gears and fills the gear case 102 flows in the gear case 102 by the rotation of the gears. At this time, worn metal powder generated by gear-coupling of the gears is mixed in the grease 115. The flow of the grease 115 reaches to the oil seals 117 and 118 positioned in the vicinity of the initial gear-coupling of the reduction gears 101 for sealing the rotor shaft 105 of the motor.

Since the sub oil seal 118 has the sub lip 118a which is positioned ahead against the grease 115, the flow of the grease 115 reaches the sub lip 118a first. In this embodiment, the sub lip 118a has a thickness of about 1 mm and a length 2-3 mm from the root to the top and is designed to contact the rotor shaft substantially parallel to the rotor shaft 105. By means of its lip-like shape, the sub lip 118a can be deformed flexibly responding to a force applied thereto.

Accordingly, when a pressure shown by arrow P in FIG. 6 is applied to the sub lip 118a by the flow of the grease 115, the sub lip 118 is distorted by the pressure as shown by dotted line in FIG. 6, to be pressed to contact more on the rotor shaft 105, and thereby the rotor shaft 105 is certainly sealed. Due to the above-mentioned function made by the sub lip 118a during the flow of the grease 115, the interference of the sub lip 118a and the rotor shaft 105 can be minimized or zero. In this embodiment, the interference of the sub lip 118a and the rotor shaft 105 is selected to be in a range of 0 to 0.4 mm. Mechanical loss of the output power of the motor 100 in this case of using the sub lip 118a is smaller than that in the conventional apparatus of using two-staged oil seals. Therefore, this embodiment can be adopted in a small electric motor for outputting several tens of watts or less.

Furthermore, a considerable amount of the liplubricating grease 120 is stably filled in the space 118c formed between the main lip 117a and the sub lip 118a as shown in FIG. 6. Hence good lubrication of the main lip 117a can be maintained for a long time and the life of the oil seal 117 can be elongated.

In the above-mentioned embodiment of the geared motor in accordance with the present invention, the main oil seal 117 having the main lip 117a and the sub oil seal 118 having the sub lip 118a are integrally configurated and used for sealing the rotor shaft 105 of the motor 100. The grease 115, which is contaminated by the worn metal powder from the gears, is sealed by the sub lip 118a. This sub lip receives the dynamic pressure of the flow of the grease 115 and deforms to contact to the rotor shaft 105 tightly.

On the other hand, the main lip 117a is lubricated by the lip-lubricating grease 120, and hence, the wear, cracking and/or hardening of the main lip 117a are/is prevented. And thereby, the lives of the oil seals 117 and 118 are elongated by means of releasing the change of the dynamic pressure of the flow of the grease 115.

Furthermore, the sub oil seal 118 introduce substantially no mechanical loss of the output of the motor 100. The sub oil seal 118 in accordance with the present invention does not require a particularly large space for providing the oil seals, since it is made integrally with the main oil seal 117.

Since the bearing fixing plate 116 is previously lightly press-fit to the offset part 105b of the rotor shaft 105, it can be easily positioned in a manner to make the protruded parts 116a and 116a face to the guide grooves 103c and 103c by rotating the rotor shaft 105. Furthermore, the male screws 112 for fixing the bearing fixing plate 116 are put in the screw holes 103d and can be screwed from the outside of the frame 103, so that the outer wheel 109a of the ball bearing 109 is easily and firmly fixed on the bottom of the center hole 103a of the cup-shaped part 1030 of the frame 103.

The bearing fixing plate 116 has the ring part 116d to be put in the center hole 103a of the cup-shaped part 1030. The bearing fixing plate 116 has a rather simple configuration with the protruded parts 116a and 116a, which are outwardly protruded from the ring part 116d. The ring part 116d is for positioning the bearing fixing plate 116 on the cup shaped part 1030 of the frame 103. Female screw parts 116b and 116b are formed on the protruded parts 116a and 116a. That is, the bearing fixing plate 116 has a simple shape which is easily manufactured, and effectively improves assembly of the bottom part of the electric motor.

Since the ball bearing 109 is fixed on the frame 103 by the bearing fixing plate 116, the ball bearing 109 of the rotor shaft 105 does not move in the axial direction of the rotor shaft 105. Therefore, the sealing of the rotor shaft 105 by the main lip 117a of the main oil seal 117 is not broken and the creep of the ball bearing 109 does not occur. As a result, abnormal noise due to the creep of the ball bearing 109 and/or the locking or burning of the motor 100 are prevented.

Although the preferred embodiment of the invention has been described in detail, it is understood that the specific details of construction and the specific arrangement of parts may be modified without departing from the spirit and the scope of the invention as hereinafter claimed.

What is claimed is
1. A geared electric motor with an improved lubricating seal comprising:
 a motor housing having a frame and a bracket;
 a gear case fixed to said motor housing;
 an electric motor disposed inside said motor housing and having a stator fixed to an inside face of said frame and having a rotor held rotatable with respect to said stator;
 a plurality of reduction gears provided inside said gear case for reducing rotation speed of an output shaft of said motor, said plurality of reduction gears being lubricated by grease in said gear case;
 sealing means for sealing said grease from said motor housing, said sealing means being positioned adjacent said reduction gears between a rotor shaft and said bracket, said sealing means having a main oil seal member with a main lip and a sub oil seal member with a sub lip, said main oil seal member being integrally coupled to said sub oil seal member, said sub lip being positioned between said grease in said gear case and said main lip;
 at least two ball bearings for rotatably supporting said rotor shaft;
 a cup-shaped part extending inward into said housing and being formed on a bottom of said frame, one of said ball bearings being fit into said cup-shaped part, an inwardly facing open end of said cup-shaped part having guide grooves; and
 bearing fixing means mated with and fixed by screws which extend from outside of said frame for fixing an outer wheel of said one of said ball bearings into said cup-shaped part of said frame.

2. A geared electric motor with an improved lubricating seal in accordance with claim 1, wherein
 a pair of helical gears are formed on an end of said rotor shaft and an initial gear of said reduction gears.

3. A geared electric motor with an improved lubricating seal in accordance with claim 1, wherein
 another grease for lubricating said main lip of said main oil seal is filled in a space formed between said main lip of said main oil seal and said sub lip of said sub oil seal.

4. A geared electric motor with an improved lubricating seal in accordance with claim 3, wherein
 said another grease has lower viscosity than that of said grease.

5. A geared electric motor with an improved lubricating seal in acordance with claim 1, wherein said sub lip of said sub oil seal member surrounds an axial portion of said rotor shaft, said sub lip having a surface contacting said grease in said gear case and extending toward the gear case along an axial extent of said rotor shaft, said sup lip surface having a decreasing diameter as it extends toward the gear case.

* * * * *